United States Patent [19]

Amano

[11] Patent Number: 5,028,860
[45] Date of Patent: Jul. 2, 1991

[54] BATTERY CHARGE APPARATUS CONTROLLED BY DETECTING CHARGE CURRENT WITH CONSTANT CHARGE VOLTAGE

[75] Inventor: Katsutoshi Amano, Kanagawa, Japan

[73] Assignee: Sony Corporation, Tokyo, Japan

[21] Appl. No.: 463,127

[22] Filed: Jan. 10, 1990

[30] Foreign Application Priority Data

Jan. 20, 1989 [JP] Japan .................... 1-12480

[51] Int. Cl.⁵ .............................................. H02J 7/04
[52] U.S. Cl. .................................... 320/23; 320/39
[58] Field of Search .................... 320/21, 22, 23, 39, 320/40

[56] References Cited

U.S. PATENT DOCUMENTS

| | | | |
|---|---|---|---|
| 4,209,736 | 6/1980 | Reidenbach | 320/22 |
| 4,233,553 | 11/1980 | Prince, Jr. et al. | 320/23 |
| 4,392,101 | 7/1983 | Saar et al. | 320/39 X |
| 4,629,965 | 12/1986 | Fallon et al. | 320/23 X |

FOREIGN PATENT DOCUMENTS 0974467  11/1982  U.S.S.R. .............................. 320/23

Primary Examiner—Steven L. Stephan
Assistant Examiner—Kristine Peckman
Attorney, Agent, or Firm—Lewis H. Eslinger; Jay H. Maioli

[57] ABSTRACT

A nonaqueous secondary battery is charged by a constant voltage. The charging current decreases with time, and, when it becomes smaller than a predetermined reference value, the charging is controlled either by terminating the charging current or by setting it at a very low value.

6 Claims, 7 Drawing Sheets

BATTERY CHARGE APPARATUS CONTROLLED BY DETECTING CHARGE CURRENT WITH CONSTANT CHARGE VOLTAGE

BACKGROUND OF THE INVENTION

1. Field of the Invention

This invention relates to charging apparatus and, more particularly, to apparatus suitable for charging a nonaqueous secondary battery.

2. Description of the Prior Art

Among secondary batteries that can be repetitively charged and discharged, there are a secondary battery using an aqueous electrolyte and what is called a nonaqueous secondary battery using an organic electrolyte.

Among secondary batteries using an aqueous electrolyte, for instance, there are a lead acid battery, a nickel-cadmium battery, and the like. Among the nonaqueous secondary batteries, for instance, there are lithium system batteries such as a manganese-lithium battery, a carbon-lithium battery and the like, as shown in Japanese laid-open patent publication No. Sho 62-82670 and Japanese laid-open patent publication No. Sho 62-82671.

Each of the secondary batteries mentioned above has its own peculiar charging characteristics, and there are conventional charging systems respectively adapted to charge the different kinds of secondary batteries. Each of the conventional charging systems must have a construction that is suitable for the type of battery to be charged.

FIG. 1 shows the charging characteristics of a conventional nickel-cadmium battery for a constant charging current. The terminal voltage Vc of the battery is time-dependent and exhibits a mountain shape, and a full charging level Lf corresponds to a peak Pvc of the mountain shape. On the other hand, the charging current Ic always maintains a constant value, for instance one ampere.

FIG. 2 shows the charging characteristics of a conventional lead acid battery for a constant charging current. The terminal voltage Vc of the battery is time-dependent and exhibits a relatively rapid rise at the initial stage of the charging and a much slower rise after it reaches a predetermined voltage, so that it ultimately approaches a constant value. On the other hand, the charging current Ic maintains a nearly constant value, for example 1 A, throughout the charging process.

Characteristic graphs for conventional systems for charging nickel-cadmium batteries are shown in FIGS. 3 to 7. Among them, FIGS. 3 to 5 show characteristic graphs for systems for controlling the charging by detecting the terminal voltage Vc of the nickel-cadmium battery, and FIGS. 6 and 7 show characteristic graphs for systems for controlling the charging by detecting the temperature Tc of the nickel-cadmium battery.

According to the charging system of FIG. 3, a predetermined limit Lvc is set to the terminal voltage Vc, and the charging is stopped when it is detected that the terminal voltage Vc of the nickel-cadmium battery has reached the limit Lvc.

According to the charging system of FIG. 4, the charging is stopped when it is detected that the terminal voltage Vc of the nickel-cadmium battery has reached the peak Pvc.

The charging system of FIG. 5 relates to what is called a $(-\Delta V)$ control system, wherein the charging is stopped when it is detected that the terminal voltage Vc of the nickel-cadmium battery has reached the peak Pvc and thereafter has decreased by a predetermined voltage $\Delta V$.

The charging system of FIG. 6 relates to a control system based on the temperature Tc of the nickel-cadmium battery. The battery temperature Tc at the end of the charging suddenly rises and becomes, for instance, about 40 to 50° C. Therefore, the charging is stopped by employing a sensor to detect such an increase in the temperature.

The charging system of FIG. 7 relates to what is called a $(\Delta T)$ control system. As the end of the charging process is approached, the battery temperature Tc begins to rise. When the increase in temperature reaches a predetermined value $\Delta T$, the charging is stopped.

For charging a lead acid battery, the charging characteristics of which are illustrated in FIG. 2, there are a conventional charging system (not shown) in which the charging is stopped when it is detected that the terminal voltage Vc of the secondary battery has reached a predetermined value and another conventional charging system (also not shown) in which the charging is stopped after a predetermined time as measured by a charging timer has elapsed.

In order to charge the nonaqueous secondary batteries mentioned above, one might first think of employing a conventional system designed for charging a secondary battery having an aqueous electrolyte. For instance, one might consider employing a system designed for charging a nickel-cadmium battery in order to charge a nonaqueous secondary battery. However, among the charging systems for the nickel-cadmium battery, the system shown in FIG. 3, in which the charging is carried out until the terminal voltage Vc reaches the limit Lvc, has the problem that the battery charge reaches about 80% at most; in other words, by means of this system the battery cannot be fully charged. On the other hand, the control system shown in FIG. 4 and the $(-\Delta V)$ control system shown in FIG. 5 have the problem that they cannot be employed because the charging characteristics of the nonaqueous secondary battery do not show a mountain shape and do not have the peak Pvc required for operation of the systems of FIGS. 4 and 5.

Moreover, a control system based on the battery temperature Tc mentioned above also has a problem as a charging system for a nonaqueous secondary battery. For instance, if a system using an increase in the battery temperature Tc as an indication to limit the charging (FIG. 6) is used to charge a lithium system secondary battery, there is a danger of explosion.

Conventional charging systems for a lead acid battery, for instance, a system that sets the charging time using a timer, are also unsuitable for use in charging a nonaqueous secondary battery. The charging current Ic of a nonaqueous secondary battery changes substantially depending on the ambient temperature of the battery. Therefore, even if a constant charging time is set, the charging rate may not be stable and it is not always possible to be certain of charging the battery fully. On the other hand, a charging system based on the detection of the terminal voltage Vc of the secondary battery and used for charging a lead acid battery also presents a problem. Specifically, it is not always possible to be certain of charging the battery fully, because the performance of the secondary battery and the charging current Ic change substantially with changes in the ambient temperature of the battery even if the terminal voltage Vc of the secondary battery has reached the predetermined value.

OBJECTS AND SUMMARY OF THE INVENTION

It is, therefore, an object of the present invention to remedy the problems of the prior art noted above. In particular, an object of the invention is to provide a charging apparatus that can safely, certainly, and fully charge a nonaqueous secondary battery.

Another object of the invention is to provide a charging apparatus that is simple in construction an inexpensive to manufacture.

In accordance with an aspect of the present invention, there is provided apparatus for charging a nonaqueous secondary battery, the apparatus comprising: means for generating a constant voltage and applying it to the nonaqueous secondary battery for generating a charging current therein, the charging current decreasing as a function of time; a detecting circuit responsive to the charging current for generating a control signal when the charging current becomes smaller than a reference value; and means responsive to the control signal for controlling the charging current.

In accordance with an independent aspect of the invention, there is provided apparatus for charging a nonaqueous secondary battery, the apparatus comprising: means for generating a constant voltage and applying it to the nonaqueous secondary battery for generating a charging current therein; a detecting circuit connected to the means for generating a constant voltage for detecting the charging current; and an electronic switch connected between the detecting circuit and the secondary battery which is turned OFF by an output signal of the detecting circuit when a value of the charging current becomes smaller than a predetermined value.

The charging characteristics of the nonaqueous secondary battery are such that, as the charging progresses, the charging current value rapidly decreases. Therefore, in the charging apparatus according to the present invention, the nonaqueous secondary battery is charged by a constant voltage, the charging current value is monitored, and, when the charging current becomes smaller than a predetermined reference value, either the charging current is shut off entirely or the charging mode is switched to an ordinary charging mode wherein a very small charging current is maintained, thereby controlling the charging.

Since the charging is controlled on the basis of a comparison between the charging current value in the full charging mode and a predetermined reference value, the nonaqueous secondary battery can be safely, certainly, and fully charged.

The foregoing and other objects, features and advantages of the present invention will become readily apparent from the following detailed description of preferred embodiments thereof, which is to be read in connection with the accompanying drawings.

DESCRIPTION OF THE PREFERRED EMBODIMENT

Preferred embodiments of the present invention will be described hereinbelow with reference to FIGS. 8-10. The embodiments relate to the case where the invention is applied to a charging apparatus for charging a nonaqueous secondary battery (referred to hereinafter simply as a secondary battery) of the lithium system.

Figure 1:
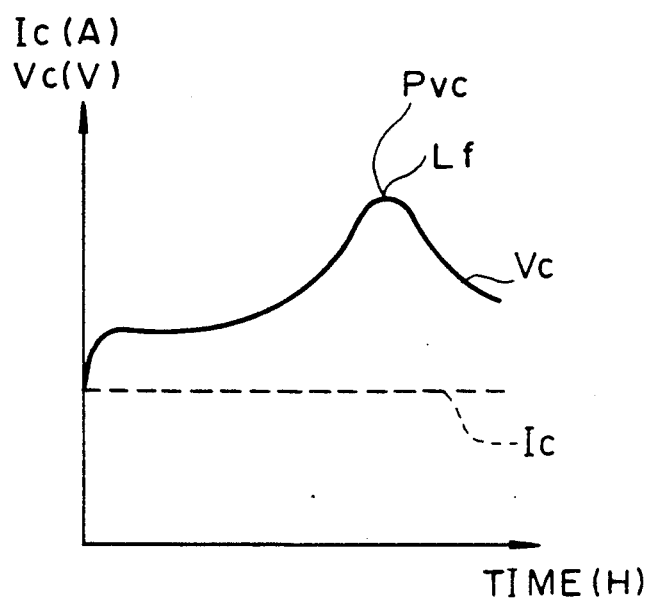
FIG. 1 is a graph showing the charging characteristics of a nickel-cadmium battery.
Figure 2:
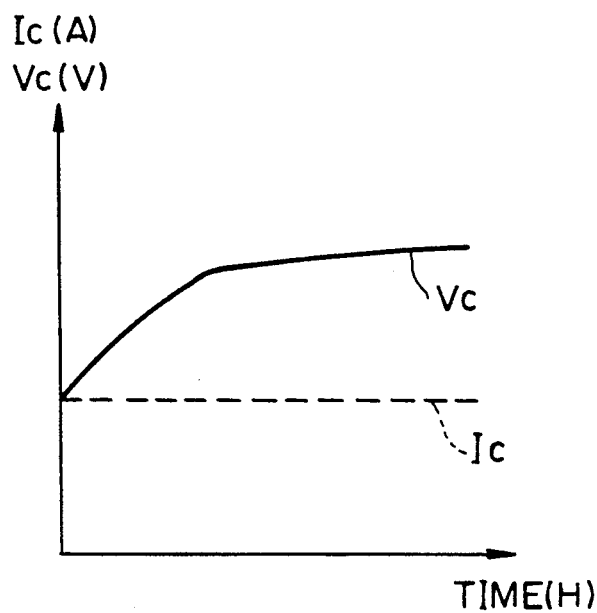
FIG. 2 is a graph showing the charging characteristics of a lead acid battery.
Figure 3:
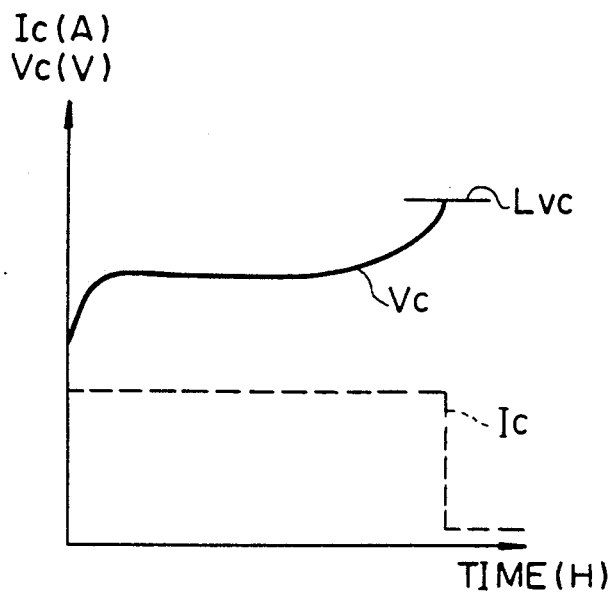
FIGS. 3 to 5 are graphs showing the charging characteristics of respective charging systems the operation of each of which is controlled on the basis of detection of the terminal voltage of a nickel-cadmium battery.
Figure 4:
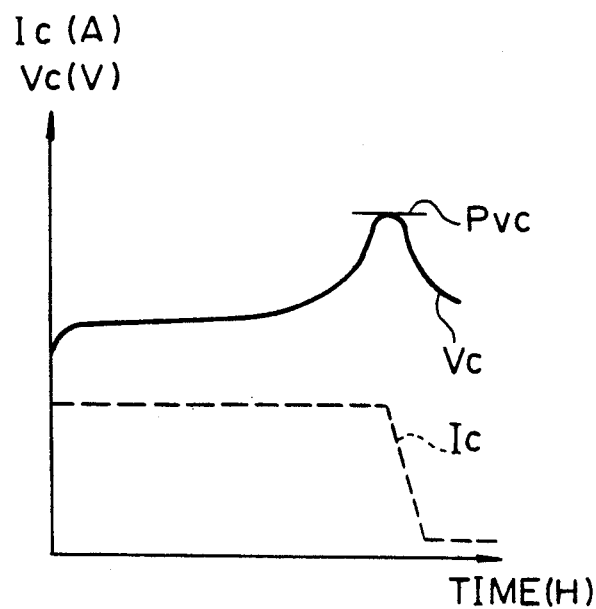
Figure 5:
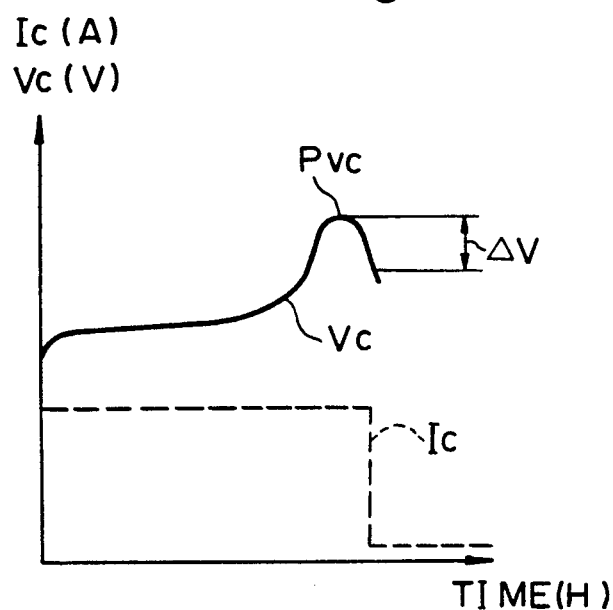
Figure 6:
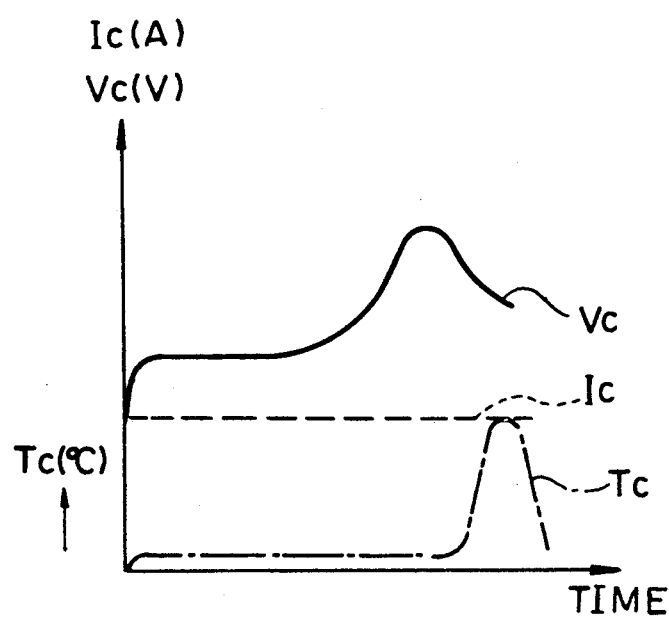
FIGS. 6 an 7 are graphs showing the charging characteristics of respective charging system the operation of each of which is controlled on the basis of detection of the temperature of a nickel-cadmium battery.
Figure 7:
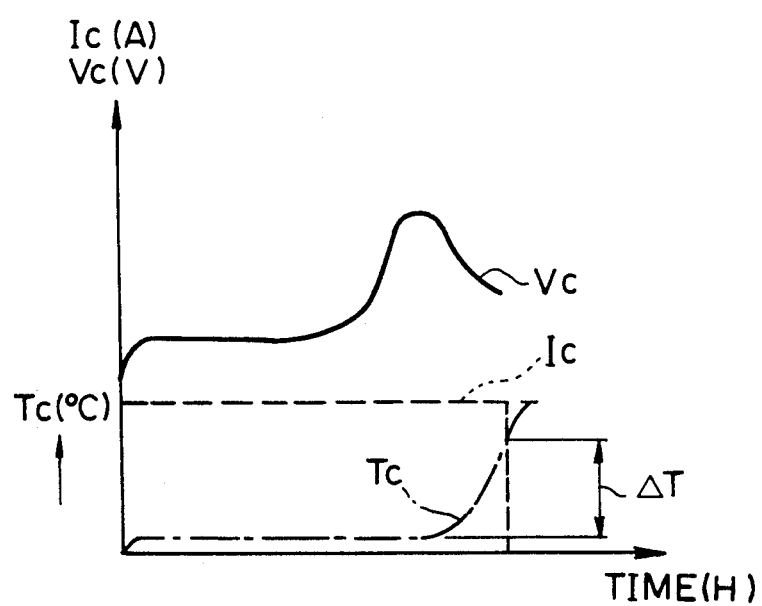
Figure 8:
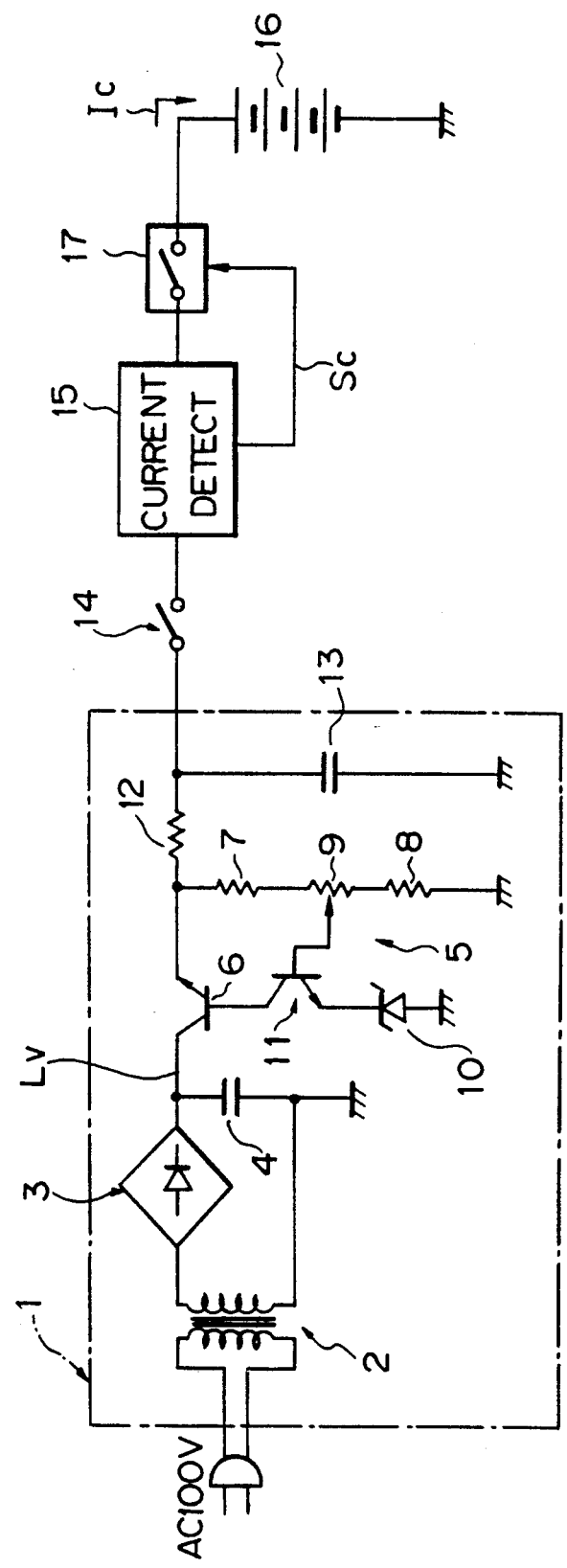
FIG. 8 is a block diagram of a first preferred embodiment of a charging apparatus in accordance with the present invention.

In the apparatus of FIG. 8, a power source voltage of 100 ACV (alternating current at 100 volts) is supplied to the primary side of a power transformer 2 of a power source section 1. The power source voltage is stepped down by the power transformer 2 and is taken out as an output voltage from the secondary side. The output voltage is transmitted through a rectifying circuit 3 comprising diodes and through a smoothing capacitor 4 connected between a power source line Lv and the ground and is transformed into a DC (direct current) voltage. The DC voltage is further supplied to a series regulator 5.

The series regulator 5 comprises: an NPN transistor 6 whose collector and emitter terminals are serially connected to the power source line Lv and whose base is connected to an NPN transistor 11; resistors 7 and 8 and a variable resistor 9 which are serially connected between the power source line Lv and the ground; the NPN transistor 11, whose base is connected to a movable terminal of the variable resistor 9, whose collector is connected to the base of the transistor 6, and whose emitter is connected to the ground through a Zener diode 10; a resistor 12: and a capacitor 13 connected between the power source line Lv and the ground.

The DC voltage, which is regulated to a constant voltage (substantially 8.2 V, the maximum value being 8.5 V) by the series regulator 5, is supplied to a conventional current detecting circuit 15 through a switch 14 that is manually operated. The switch 14 can also be automatically turned ON (closed) when a secondary battery 16 is charged.

The DC voltage is compared with a preset or predetermined reference current value by the current detecting circuit 15. If the charging value is equal to the preset or predetermined reference value, for instance, 0.1 A (value in amperes of the charging current Ic in the full charging mode), a control signal Sc is supplied to an electronic switch 17, thereby controlling the electronic switch 17. The DC voltage passes through the current detecting circuit 15 and electronic switch 17 and is supplied to the secondary battery 16, so that the secondary battery 16 is charged.

The charging of the secondary battery will now be described.

As mentioned above, the power source voltage of 100 ACV is converted into the DC voltage by the power source section 1, and the DC voltage is set to a regulated value. When both the manually or automatically operated switch 14 and the electronic switch 17 are turned ON (closed), the DC voltage is supplied to the secondary battery 16, and the secondary battery 16 is charged.

Figure 9:
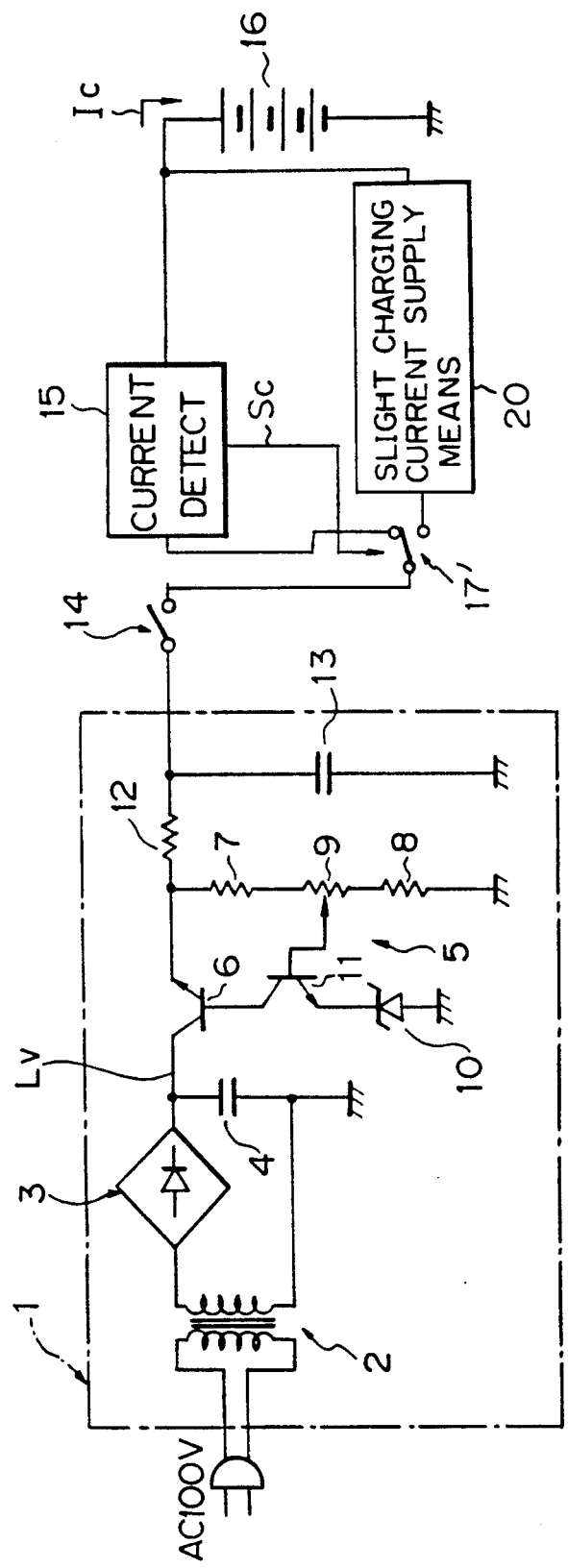
FIG. 9 is a block diagram of a second preferred embodiment of a charging apparatus in accordance with the invention.

The apparatus of FIG. 9 is identical to the apparatus of FIG. 8 except that the switch 17 of FIG. 8 is replaced in FIG. 9 by a switch 17' having a movable contact that can select alternately the current detector 15 or a slight charging current supply means 20 in accordance with the control signal Sc. In the full charge mode, the control signal Sc controls the switch 17' to select the current detector 15 so that charging current flows from the power source section 1 through the switches 14 and 17' and the current detector 15 to charge the battery 16.

The DC voltage supplied by the power source section 1 is compared with a preset or predetermined reference current value by the current detecting circuit 15, as in the embodiment of FIG. 8. So long as the charging current value exceeds the preset or predetermined reference value, for instance, 0.1 A, the control signal Sc supplied to the electronic switch 17' enables charging of the secondary battery 16.

Figure 10:
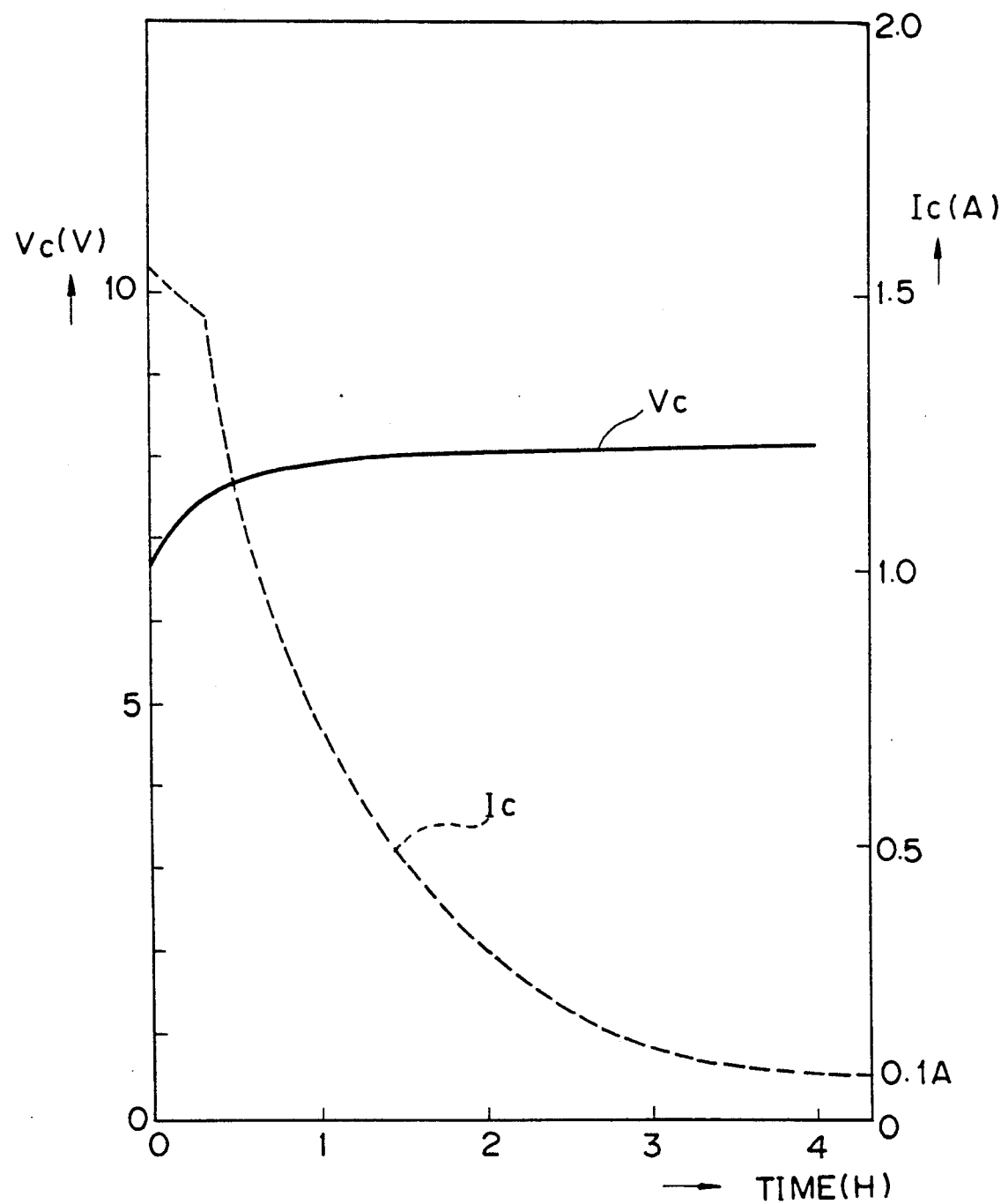
FIG. 10 is a graph showing the charging characteristics of the charging apparatus of FIGS. 8 and 9 when charging a nonaqueous secondary battery of the lithium system.

FIG. 10 shows the charging characteristics of a nonaqueous secondary battery. As the diagram shows, the charging current Ic begins at a level of about 1.5 A and decreases relatively slowly for a charging time of about 0.4 hours (hereinafter abbreviated to H).

Thereafter, the charging current Ic rapidly decreases as the charging of the secondary battery 16 progresses, then decreases more slowly and finally becomes relatively stable at a low level (about 0.1 A) at about 3.5 H.

On the other hand, the terminal voltage Vc of the secondary battery 16 rises rapidly at 0.4 H until a charging time near 0.4 H. Then it increases more slowly until near 1 H and finally becomes relatively constant at about 1.5 H at a voltage of about 8 V.

The current detecting circuit 15 (FIGS. 8 and 9) monitors the value of the charging current Ic during the time interval when the secondary battery 16 is being charged. If the charging current Ic decreases a described above and shown in FIG. 10 and reaches a predetermined value (the value of the charging current Ic in the full charging mode), for instance 0.1 A, the control signal Sc is supplied from the current detecting circuit 15 to the electronic switch 17 (FIG. 8) or 17' (FIG. 9).

In the embodiment of FIG. 8, this shuts off the charging current Ic. The electronic switch 17 is turned OFF (opened) by the control signal Sc, and the supply of the charging current Ic is stopped. When the value of the charging current Ic reaches 0.1 A, the charging is about 98% completed; in other words, an essentially fully charged state has been obtained.

In the embodiment of FIG. 9, the electronic switch 17' is switched to include the slight charging current supply means 20 in the circuit. The device 20 maintains a small charging current through the secondary battery 16.

In both embodiments, since the secondary battery 16 is charged while comparing the charging current Ic with a preset or predetermined reference current value under the regulated voltage as described above, the battery 16 can be safely, certainly, and fully charged.

Thus at the end of the full charging mode the charging current Ic is interrupted (FIG. 8) or the charging apparatus switches to an ordinary charging mode in which only a slight charging current Ic or charging current of a very low value is continuously supplied without shutting off the charging current Ic.

According to the invention, the nonaqueous secondary battery is charged by the regulated voltage, the charging current value is monitored, and, when the charging current value becomes smaller than a set or predetermined reference value, the charging is controlled, by either interrupting the charging current or maintaining it at a low level, so that the battery can be safely, certainly, and fully charged.

In contrast, in a conventional charging system, for instance, in a charging system in which the charging is stopped when it is detected that the terminal voltage of the secondary battery has reached a predetermined value or a charging system in which the charging time is set by a timer and the charging is stopped after a predetermined time has elapsed, the charging current changes because of variations in the performance of the secondary battery, the ambient temperature of the battery, and the like, so that it is difficult to charge the battery fully and reliably. In accordance with the invention, it is possible to have full confidence that the secondary battery has been fully charged.

Many modifications of the preferred embodiments of the invention described above will readily occur to those skilled in the art, and the invention is limited only by the appended claims.

I claim:

1. Apparatus for charging a battery, said apparatus comprising:

means for generating a constant voltage and applying it to a nonaqueous, organic electrolyte, lithium secondary battery for generating a charging current therein, said charging current decreasing rapidly as a function of time from an initial maximum current to a stable, low level of charging current substantially equal to 10% of said initial maximum current;

a detecting circuit responsive to said charging current for generating a control signal when said charging current becomes smaller than a reference value substantially equal to said stable, low level of charging current; and means responsive to the control signal for controlling said charging current.

2. Apparatus according to claim 1 wherein the controlling of said charging current is effected by terminating said charging current.

3. Apparatus according to claim 1 wherein the controlling of said charging current is effected by setting said charging current at a very low value.

4. Apparatus for charging a battery, said apparatus comprising:

means for generating a constant voltage and applying it to a nonaqueous, organic electrolyte, lithium secondary battery for generating a charging current therein, said lithium secondary battery having a charging current characteristic that rapidly decreases from an initial maximum level before reaching a stable low level that is substantially equal to 10% of said initial maximum level;

a detecting circuit connected to said means for generating a constant voltage for detecting said charging current; and an electronic switch connected between said detecting circuit and said secondary battery which is turned OFF by an output signal of said detecting circuit when a value of said charging current becomes smaller than a predetermined value substantially equal to said stable low level of charging current.

5. Apparatus according to any of claims 1-4 wherein said predetermined value is selected to correspond to a value of said charging current at the end of the charging.

6. Apparatus according to any of claim 1-4 wherein said means for generating a constant voltage comprises an alternating current source, a rectifying circuit and a voltage regulator.

* * * * *